(12) United States Patent
Jones

(10) Patent No.: US 9,931,997 B1
(45) Date of Patent: Apr. 3, 2018

(54) VEHICLE DOOR PROTECTOR SYSTEM

(71) Applicant: Kendall T. Jones, Dunedin, FL (US)

(72) Inventor: Kendall T. Jones, Dunedin, FL (US)

( * ) Notice: Subject to any disclaimer, the term of this patent is extended or adjusted under 35 U.S.C. 154(b) by 0 days.

(21) Appl. No.: 14/308,331

(22) Filed: Jun. 18, 2014

Related U.S. Application Data

(60) Provisional application No. 61/840,515, filed on Jun. 28, 2013.

(51) Int. Cl.
*B60R 13/04* (2006.01)
(52) U.S. Cl.
CPC .................... *B60R 13/04* (2013.01)
(58) Field of Classification Search
CPC ........ B60R 19/42; B60R 19/40; B60J 11/025; B60J 11/06
See application file for complete search history.

(56) References Cited

U.S. PATENT DOCUMENTS

| | | | | |
|---|---|---|---|---|
| 5,333,923 A * | 8/1994 | Whitfield | ....................... | 293/128 |
| 6,736,435 B1 * | 5/2004 | Ditthavong | .................. | 293/128 |
| 8,573,661 B1 * | 11/2013 | Moreno | ........................ | 293/128 |
| 2003/0209914 A1 * | 11/2003 | Cano | ............................. | 293/128 |
| 2007/0158963 A1 * | 7/2007 | Debs | ............................. | 293/128 |
| 2007/0273167 A1 * | 11/2007 | Alexander et al. | ........... | 293/126 |
| 2009/0026776 A1 * | 1/2009 | Simmons | ...................... | 293/128 |
| 2013/0147173 A1 * | 6/2013 | Wohlberg et al. | ............ | 280/770 |

* cited by examiner

*Primary Examiner* — Gregory J Strimbu

(57) ABSTRACT

A vehicle door protector is formed of a first segment, a plurality of intermediate segments, and a last segment. The axes of the segments are in axial alignment. Each segment has a leading end and a trailing end, an exterior surface and a rectangular planar passageway, and a top and a bottom. The first segment and the intermediate segments each have a radial stop extending into the passageway of an adjacent segment. The intermediate segments and the last segment each have a circumferential stop axially aligned with the radial stops. A securing strap has an inner end attached to the trailing end of the last segment. The securing strap has an outer end with a magnet to hold the vehicle door protector in an operative orientation with respect to the vehicle door to be protected.

1 Claim, 4 Drawing Sheets

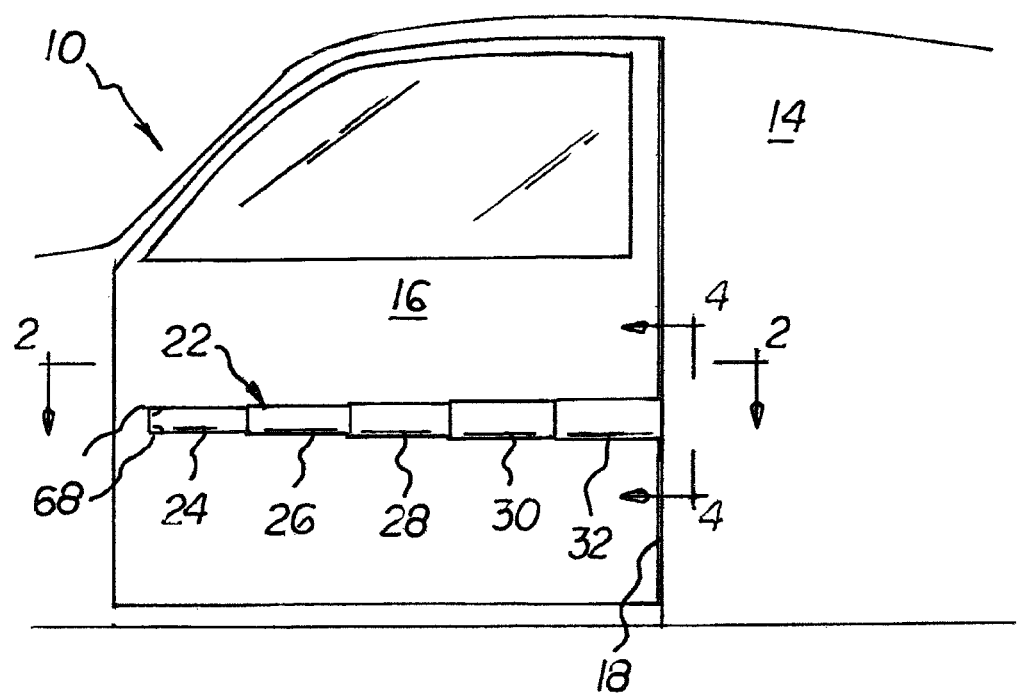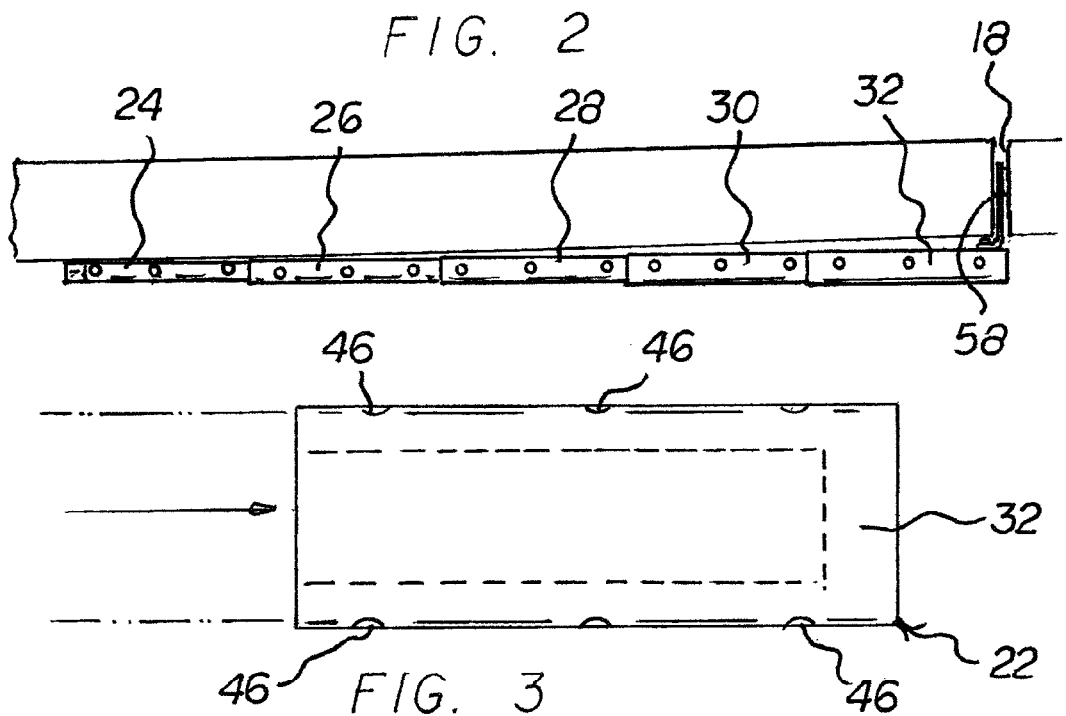

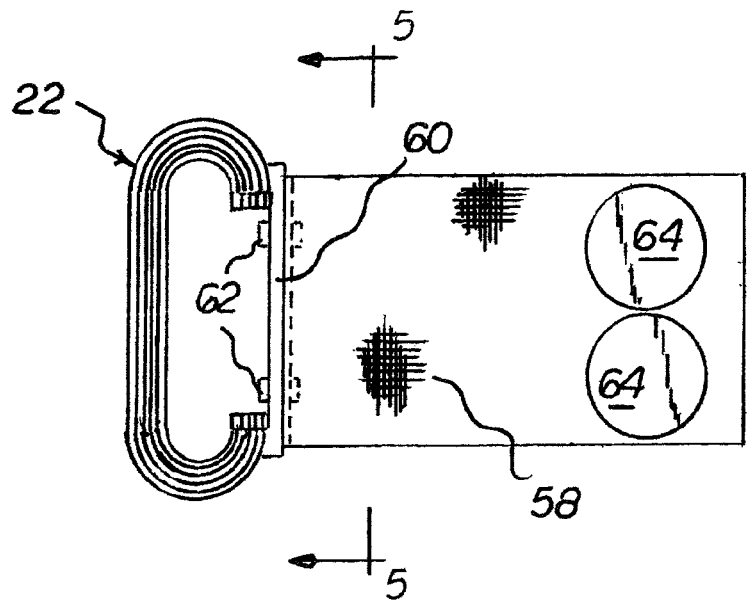
FIG. 4
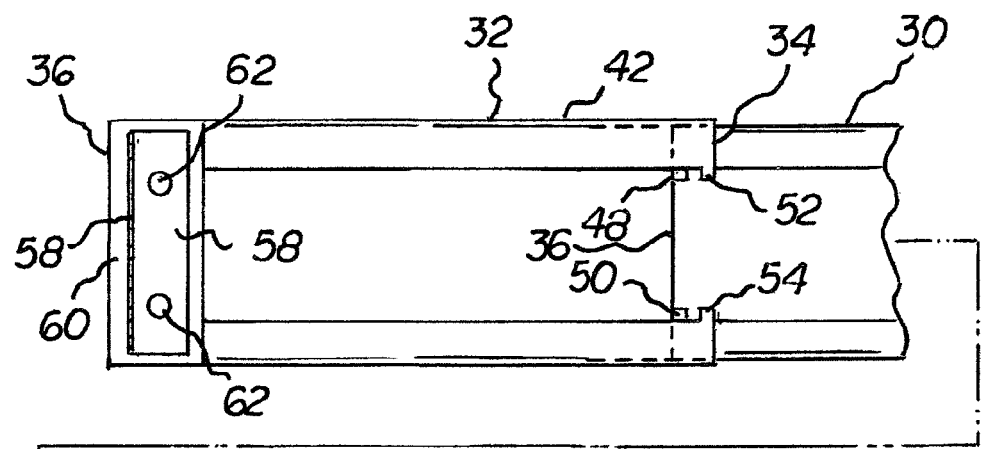
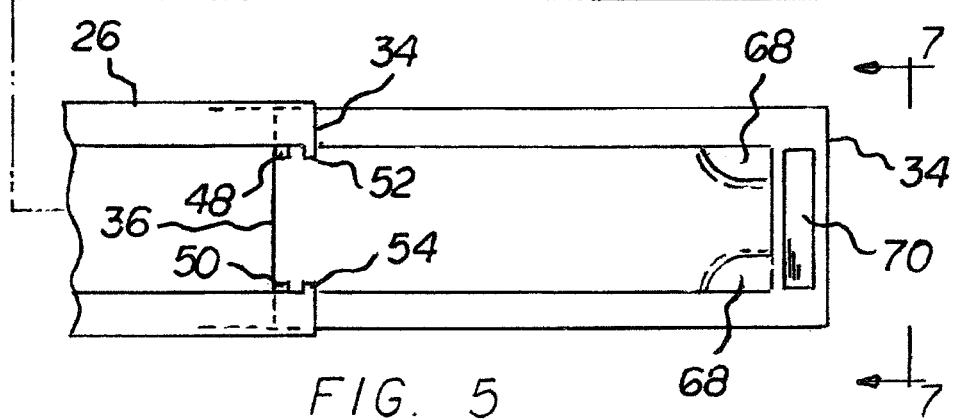
FIG. 5

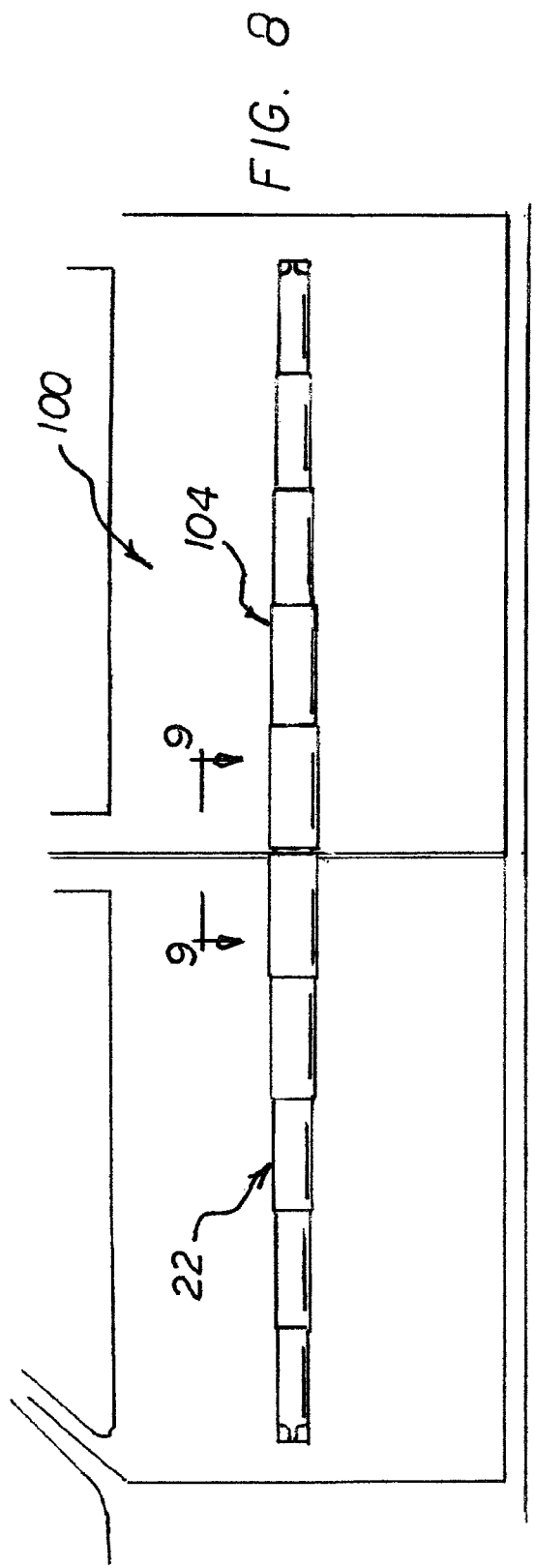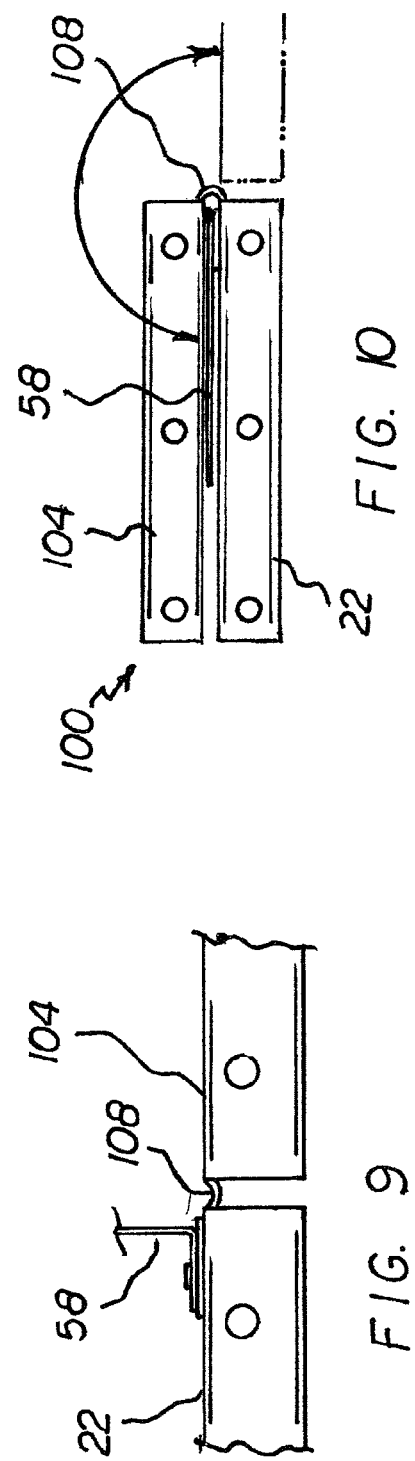

VEHICLE DOOR PROTECTOR SYSTEM

RELATED APPLICATION

This application is based upon and claims the benefit of Provisional Application Ser. No. 61/840,515 filed Jun. 28, 2013, the subject matter of which is incorporated herein by reference.

BACKGROUND OF THE INVENTION

Field of the Invention

The present invention relates to a vehicle door protector system and more particularly pertains to removable positioning on a side of a vehicle and for protecting the side of the vehicle from dings resulting from accidental contact with an adjacent vehicle, the positioning and protecting being done in a safe, convenient and economical manner.

DESCRIPTION OF THE PRIOR ART

The use of vehicle door protection systems of known designs and configurations is known in the prior art. More specifically, vehicle door protection systems of known designs and configurations previously devised and utilized for the purpose of protecting vehicle doors from damage are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a vehicle door protector system that allows for the removable positioning on a side of a vehicle and for protecting the side of the vehicle from dings resulting from accidental contact with an adjacent vehicle, the positioning and protecting being done in a safe, convenient and economical manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Therefore, it can be appreciated that there exists a continuing need for a new and improved vehicle door protector system which can be used for the removable positioning on a side of a vehicle and for protecting the side of the vehicle from dings resulting from accidental contact with an adjacent vehicle, the positioning and protecting being done in a safe, convenient and economical manner. In this regard, the present invention substantially fulfills this need.

SUMMARY OF THE INVENTION

In view of the disadvantages inherent in the known types of vehicle door systems of known designs and configurations now present in the prior art, the present invention provides an improved vehicle door protector system. As such, the general purpose of the present invention, which will be described subsequently in greater detail, is to provide a new and improved vehicle door protector system and method which has all the advantages of the prior art and none of the disadvantages.

To attain this, in the broad context, the present invention essentially comprises a front vehicle door protector. The front vehicle door protector has a first segment. The front vehicle door protector has a plurality of intermediate segments. The front vehicle door protector also has a last segment. Each segment has an axis. The axes of the segments are in axial alignment. Each segment has a leading end and a trailing end. Each segment has an exterior surface. Each segment has a rectangular planar passageway. Each segment also has a top and a bottom. The first segment and the intermediate segments each have a radial stop. The radial stop extends into the passageway of an adjacent segment. The intermediate segments and the last segment each have a circumferential stop. The circumferential stop is axially aligned with the radial stops. Provided last is a security strap. The security strap has an inner end. The inner end of the security strap is attached to the trailing end of the last segment. The security strap has an outer end. The outer end has a magnet. In this manner the front vehicle door protector is held in an operative orientation with respect to the front vehicle door. Further in this manner the front vehicle door is protected. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved vehicle door protector system which has all of the advantages of the prior art vehicle door protection systems of known designs and configurations and none of the disadvantages.

It is another object of the present invention to provide a new and improved vehicle door protector system which may be easily and efficiently manufactured and marketed.

It is a further object of the present invention to provide a new and improved vehicle door protector system which is of durable and reliable constructions.

An even further object of the present invention is to provide a new and improved vehicle door protector system which is susceptible of a low cost of manufacture with regard to both materials and labor, and which accordingly is then susceptible of low prices of sale to the consuming public, thereby making such vehicle door protector system economically available to the buying public.

Lastly, another object of the present invention is to provide a vehicle door protector system for removable positioning on a side of a vehicle and for protecting the side of the vehicle from dings resulting from accidental contact with an adjacent vehicle, the positioning and protecting being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a vehicle door protector system constructed in accordance with the principles of the present invention.

FIG. 2 is plan view looking down at the entire system of the present invention taken along line 2-2 of FIG. 1.

FIG. 3 is a front elevational view of the last segment shown in FIG. 1.

FIG. 4 is an end view of the segments and the strap taken along line 4-4 of FIG. 1.

FIG. 5 is a rear elevational view of a first segment with part of an intermediate segment and a last segment with part of an intermediate segment.

FIG. 8 is a front elevational view similar to FIG. 1 but illustrating an alternate 4-door embodiment of the present invention.

FIGS. 9 and 10 are plan views of the system taken along line 9-9 of FIG. 8, FIG. 9 showing the system in an operative orientation, FIG. 10 showing the system in a folded orientation.

The same reference numerals refer to the same parts throughout the various Figures.

DESCRIPTION OF THE PREFERRED EMBODIMENT

Figure 6:
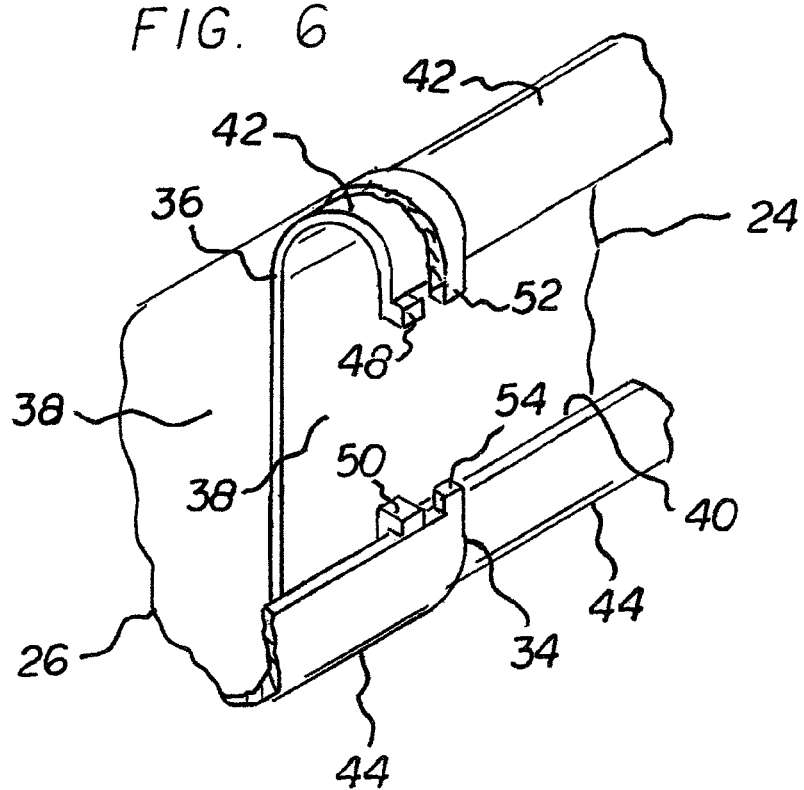
FIG. 6 is a perspective illustration view of travel stops and keepers of adjacent segments.
Figure 7:
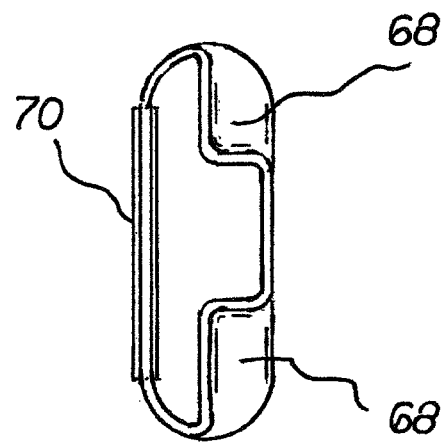
FIG. 7 is an end view of the first segment taken along line 7-7 of FIG. 5.

With reference now to the drawings, and in particular to FIG. 1 thereof, the preferred embodiment of the new and improved vehicle door protector system embodying the principles and concepts of the present invention and generally designated by the reference numeral 10 will be described.

The present invention, the vehicle door protector system 10 is comprised of a plurality of components. Such components in their broadest context include a vehicle door protector and a securing strap. Such components are individually configured and correlated with respect to each other so as to attain the desired objective.

With reference now to the drawings, and in particular to FIG. 1 thereof, the preferred embodiment of the new and improved vehicle door protector system embodying the principles and concepts of the present invention and generally designated by the reference numeral 10 will be described.

The present invention, the vehicle door protector system 10 is comprised of a plurality of components. Such components are individually configured and correlated with respect to each other so as to attain the desired objective. In their broadest context such include a front vehicle door protector and a security strap.

From a specific standpoint, the preferred embodiment of the vehicle door protector system is designated by reference numeral 10. First provided is a vehicle 14. The vehicle has a vehicle door 16. The vehicle has an opening 18. The opening removably receives the vehicle door. The vehicle door is movable to an open position remote from the opening. The vehicle door is movable to a closed position within the opening. The vehicle door has an exterior surface to be protected. The vehicle door and the opening are fabricated of a magnetically responsive material.

A front vehicle door protector 22 is provided. The front vehicle door protector has a plurality of segments. The segments include a first segment 24. The segments include primary intermediate segment 26. The primary interment segment is slidable over the first segment. The segments include a secondary intermediate segment 28. The secondary intermediate segment is slidable over the primary intermediate segment. The segments include a tertiary intermediate segment 30. The tertiary intermediate segment is slidable over the secondary intermediate segment. The segments further include a last segment 32. The last segment is slidable over the tertiary intermediate segment. Each segment has an axis. The axes of the segments are in axial alignment. Each segment has a leading end 34. Each segment has a trailing end 36. Each segment has a rectangular planar exterior 38. Each segment has a rectangular planar passageway 40. Each segment has a semi-cylindrical top 42. Each segment has a semi-cylindrical bottom 44. In the disclosed preferred embodiment of the invention, the top and the bottom of each segment have holes 46. The holes are provided through each segment. In this manner water drainage is allowed regardless of positioning, left or right side, of the vehicle door protector.

The first segment and the primary intermediate segment and the secondary intermediate segment and the tertiary intermediate segment each have upper and lower radial stops 48, 50. The radial stops extend into the passageway of an adjacent segment. The primary intermediate segment and the secondary intermediate segment and the tertiary intermediate segment and the last segment each have upper circumferential stop 52. The upper circumferential stops are axially aligned with the upper radial stops. The primary intermediate segment and the secondary intermediate segment and the tertiary intermediate segment and the last segment each have a lower circumferential stop 54. The lower circumferential stop is axially aligned with the lower radial stops.

A rectangular security strap 58 is provided. The security strap is fabricated of a cut resistant fabric. The security strap has an inner end and an outer end. A support bar 60, preferably fabricated of a molded plastic, is provided. The support bar is coupled to the interior end of the last segment. Rivets 62 are provided. The rivets join the inner end of the rectangular security strap to the support bar. The security strap has two circular inner magnets 64. The inner magnets are adhesively attached to the rectangular security strap adjacent to the outer end. The inner magnets are positioned on the vehicle door adjacent to the opening when the vehicle door is closed. In this manner the front vehicle door protector is in an operative orientation.

Provided last is pair of indentations 68. The indentations are provided in the leading edge of the first segment. The indentations are adapted to be grasped by a user and pulled. In this manner the radial stops of the first segment will contact and pull the circumferential stops of the primary intermediate segments. Also in this manner the radial stops of subsequent segments will pull circumferential stops of adjacent segments until the segments are fully extended. Further in this manner the regions of the vehicle door will be protected. The first segment has a rectangular magnet 70. The rectangular magnet is adhesively attached to the first segment adjacent to the leading end. In this manner support is provided to the leading end of the first segment when the system is fully extended and in use.

The interior surface of each segment preferably includes a felt backing. The felt backing is adapted to contact the vehicle door during use of the system. The felt backing functions as an anti-scratch component for the vehicle to which the system is coupled. In addition, on the interior surface of the last segment, adjacent to the leading edge, is a supplemental magnet. The supplemental magnet enhances the coupling of the system to the vehicle door during use.

In an alternate embodiment 100 of the present invention a rear vehicle door protector 104 is provided. The rear vehicle door protector is fabricated the same as the front vehicle door protector. The rear vehicle door protector further includes a living hinge 108. The living hinge pivotably couples the trailing end of the last segment of the front vehicle door protector and the trailing end of the last segment of the rear vehicle door protector.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle door protector system (10) for removable positioning on a side of a door of a vehicle and for protecting the side of the vehicle door comprising, in combination:

the vehicle (14) having an opening (18), the opening removably receiving the vehicle door, the vehicle door being movable between an open position remote from the opening and, a closed position within the opening, the vehicle door having an exterior surface to be protected, the vehicle door and the vehicle being fabricated from a magnetically responsive material;

a vehicle door protector (22) formed of a plurality of segments including a first segment (24), a primary intermediate segment (26) slidable over the first segment, a secondary intermediate segment (28) slidable over the primary intermediate segment, a tertiary intermediate segment (30) slidable over the secondary intermediate segment and a last segment (32) slidable over the tertiary intermediate segment, each said segment having an axis with the axes of the segments being in axial alignment, each said segment having a leading end (34) and a trailing end (36), each said segment having an exterior surface (38), each said segment having a C-shaped configuration, each said segment forming a passageway (40), each said segment having a semi-cylindrical top (42), each said segment having a semi-cylindrical bottom (44), holes (46) extending through the top and the bottom of each said segment for draining water;

each of the first segment, the primary intermediate segment, the secondary intermediate segment and the tertiary intermediate segment having upper and lower radial stops (48) (50) extending away from the passageway thereof, each of the primary intermediate segment, the secondary intermediate segment, the tertiary intermediate segment and the last segment having an upper circumferential stop (52) aligned with the upper radial stops and a lower circumferential stop (54) aligned with the lower radial stops;

a rectangular security strap (58) fabricated from a fabric, the security strap having an inner end and an outer end, rivets (62) couple the inner end of the rectangular security strap to the trailing end of the last segment, two circular magnets (64) adhesively attached to the rectangular security strap adjacent the outer end, the magnets positioned on the vehicle door adjacent the opening when the vehicle door is in the closed position to hold the vehicle door protector in an operative orientation; and a pair of indentations (68) formed in the leading end of the first segment, wherein to fully extend the vehicle door protector to cover the side of the vehicle door, the indentations are grasped and pulled by a user whereby the radial stops of the first segment will contact and pull the circumferential stops of the primary intermediate segment, the radial stops of the primary intermediate segment will contact and pull the circumferential stops of the secondary intermediate segment, the radial stops of the secondary intermediate segment will contact and pull the circumferential stops of the tertiary intermediate segment, and the radial stops of the tertiary intermediate segment will contact the circumferential stops of the last segment;

a rectangular magnet (70) adhesively attached to the first segment adjacent the leading end of the first segment for providing support to the leading end of the first segment when the vehicle door protector is fully extended and in use.

\* \* \* \* \*